(12) United States Patent
Glogan et al.

(10) Patent No.: US 6,970,202 B1
(45) Date of Patent: Nov. 29, 2005

(54) DEVICE FOR MOUNTING A CAMERA ON A COMPUTER

(75) Inventors: David J. Glogan, Rochester, NY (US); Glenn W. Johnson, Webster, NY (US); Jason M. Avery, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 672 days.

(21) Appl. No.: 09/604,341

(22) Filed: Jun. 27, 2000

(51) Int. Cl.[7] ............................................. H04N 5/225
(52) U.S. Cl. .................... 348/373; 348/207.1; 348/552
(58) Field of Search ............................ 348/207.1, 552, 348/211.14, 372–376; 248/917–923, 187.1

(56) References Cited

U.S. PATENT DOCUMENTS

| | | | | |
|---|---|---|---|---|
| 6,118,653 | A | * | 9/2000 | Kim ............................. 361/683 |
| 6,141,052 | A | * | 10/2000 | Fukumitsu et al. ......... 348/373 |
| 6,239,841 | B1 | * | 5/2001 | Verstockt et al. ........... 348/373 |
| 6,323,902 | B1 | * | 11/2001 | Ishikawa ..................... 348/373 |
| 6,587,151 | B1 | * | 7/2003 | Cipolla et al. .............. 348/373 |
| 6,731,340 | B1 | * | 5/2004 | Lai ............................. 348/373 |

* cited by examiner

Primary Examiner—Toan Ho
Assistant Examiner—Heather R. Long
(74) Attorney, Agent, or Firm—Pamela R. Crocker

(57) ABSTRACT

Device for mounting a tethered camera on a portable computer, including a base attached to a back of the computer's screen housing via an adhesive, a holder for the camera removably engaged to the base via cooperating mating members formed thereon, and a hinge in the holder allowing movement of the camera. The hinge includes two coil springs assembled over a pair of split shafts incorporated in the holder to provide a relatively high friction force on a pair of pins non-movably attached to the camera. The camera and holder combination can be attached to or detached from the base as need be, but the base can remain unobtrusively attached to the housing. When attached to the housing, the camera is stably held in position to allow easier hands-free use of the camera. A separate stand is also provided which can similarly mated with the holder.

37 Claims, 9 Drawing Sheets

DEVICE FOR MOUNTING A CAMERA ON A COMPUTER

BACKGROUND OF THE INVENTION

1. Field of the Invention

This invention relates to mounting a camera on a computer and, more particularly, to a device which more reliably mounts a tethered camera on a laptop computer.

2. Description of the Related Art

Digital cameras are available which can, e.g., take an image of a person using a computer, and send the image to another computer for viewing. Such cameras are usually tethered, in that the camera is attached by a cord to the user's computer to allow a certain amount of mobility for the camera. See, e.g., U.S. Pat. No. 5,402,170, issued to Parulski et al., and assigned to the assignee of the present application. These cameras are used either in a hand-held mode, which can be inconvenient for the user or, more preferably, in a hands-free mode. The shapes of most tethered cameras do not allow such cameras to be stably placed on a surface adjacent the computer. Instead, a stand is usually employed to receive the camera. Such stands, however, require a relatively flat, near-horizontal surface on which to place the stand during use of the camera.

Commonly, in a desktop computing environment, these stands are preferably placed on top of the computer monitor, if the monitor offers such a flat and horizontal surface. If not, the camera and stand are placed on the desktop next to the computer. These arrangements, however, may limit the user's working surface and/or provide an inferior angle from which to take the image. Further, if the camera is on the work surface, the camera may be knocked while the computer user is trying to work, or it may be damaged in other ways, e.g., a beverage may spill on the camera.

In the laptop environment, as with a separate mouse, there may not be a convenient place to locate a stand for such a camera. Since laptops have relatively thin, hinged screens, in comparison with the larger, box-like monitors of desktop computers, placing the stand on the laptop screen is not an option. Further, if the laptop is actually being used on one's lap, there simply may not be a flat surface nearby on which to place the stand.

The prior art generally teaches the use of a camera held by a biased, clamp-like device that is attached to the edge of the laptop computer screen. See, e.g., U.S. Pat. No. 5,855,343, issued to Krekelberg. However, the successful use of such clamps is dependent upon the shape/profile of the edge of the laptop screen. Further, and very importantly, clamp devices may stress/apply unwanted force to the screen, which could damage the screen. Moreover, clamp-type devices may partially obscure the screen. Also, the clamps in these devices are usually permanently and non-movably fixed to the camera, which clamps may get in the way when moving the camera. Also, there is no separate stand available to stably hold the camera and clamp when not in use on the laptop.

Alternatively, laptop computers are known which incorporate a camera permanently within the laptop housing. See, e.g., U.S. Pat. No. 5,801,919, issued to Griencewic. Such an arrangement can be expensive to produce and service, and the camera is not available for removal and use with other computers. Also, when such a camera is permanently attached to the laptop housing by a pivot, the amount of articulation available to the camera may be limited. Where the camera is permanently attached to the housing by a cord, hands-free use of the camera is not possible.

In another attempt to satisfy the object of hands-free use of a camera for a laptop, U.S. Pat. No. 5,808,672, issued to Wakabayashi et al. relates to a camera hinged to a member, such as a PCMCIA card, that is electrically plugged into a desktop or a laptop. Again, articulation can be limited. Also, it is possible that, if the camera is knocked inadvertently during use, the electrical connection can be damaged. Damage from spillage can also be of concern.

An articulatable tethered digital camera could use a hinge mechanism, but same must not only be small and inexpensive, but also must provide moderate frictional force (torque). The hinge must be able to withstand the weight of the camera and the cord so that the camera remains pointed at the subject. Generally, however, the hinges that are used in, e.g., laptop computers provide too much friction, are too large or are too expensive to be reliably used as a hinge for a tethered digital camera. See, e.g., U.S. Pat. No. 5,018,244, issued to Hino, and 5,832,566, issued to Quek et al., for examples of laptop hinges which seek to hold a laptop screen housing in a particular position relative to the laptop base. A plastic hinge also may experience "creep," which is permanent deformation due to prolonged exposure to elevated temperature and or stress of the plastic materials.

A need exists for a way to stably hold and articulate a tethered digital camera in the hands-free mode, while the camera is being used with a computer.

SUMMARY OF THE INVENTION

Accordingly, it is a purpose of the present invention to provide a mounting device for reliably mounting a camera on a computer.

It is another purpose of the present invention to provide a tethered camera mounting device which is easy to use, removable and low cost.

It is another purpose of the present invention to provide a laptop computer camera mount that does not obscure or damage the laptop screen.

It is another purpose of the present invention to provide a device for mounting a tethered camera on a computer, which device has fewer parts than conventional devices, and which is more economical to produce.

It is another purpose of the present invention to provide a simple hinge that provides adequate torque for reliably articulating and supporting a camera relative to a holder for the camera attached to a computer.

It is still another purpose of the present invention to provide a hinge that is compact, provides moderately high frictional force, and is relatively inexpensive to produce.

Finally, it is a purpose of the present invention to provide a tethered camera mounting device for a laptop computer, including a hinge allowing the camera angle to be adjusted, based on a position of the hinged laptop screen.

To achieve the foregoing and other purposes of the present invention, there is provided a tethered camera mounting device for a computer, including a base adhered to the rear of a laptop screen housing via an adhesive, a holder for the camera which is removably engaged with the base via cooperating mating members formed respectively thereon, and a hinge in the holder to allow articulation of the camera. The camera is stably held in position on the laptop to allow easier hands-free use of the camera. The hinge includes two coil springs assembled over a pair of split shafts incorporated in the holder to provide a relatively high frictional force on a pair of pins rotatably received in the hinge, but fixedly received in the camera. The camera and holder combination can be attached to or detached from the base as need be, but the base can remain unobtrusively attached to the laptop screen housing. A separate stand, having a similar mating member to that of the base, can also be used to removably receive the holder and camera combination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments of the present invention will now be described in detail with reference to FIGS. 1–8.

Figure 4:
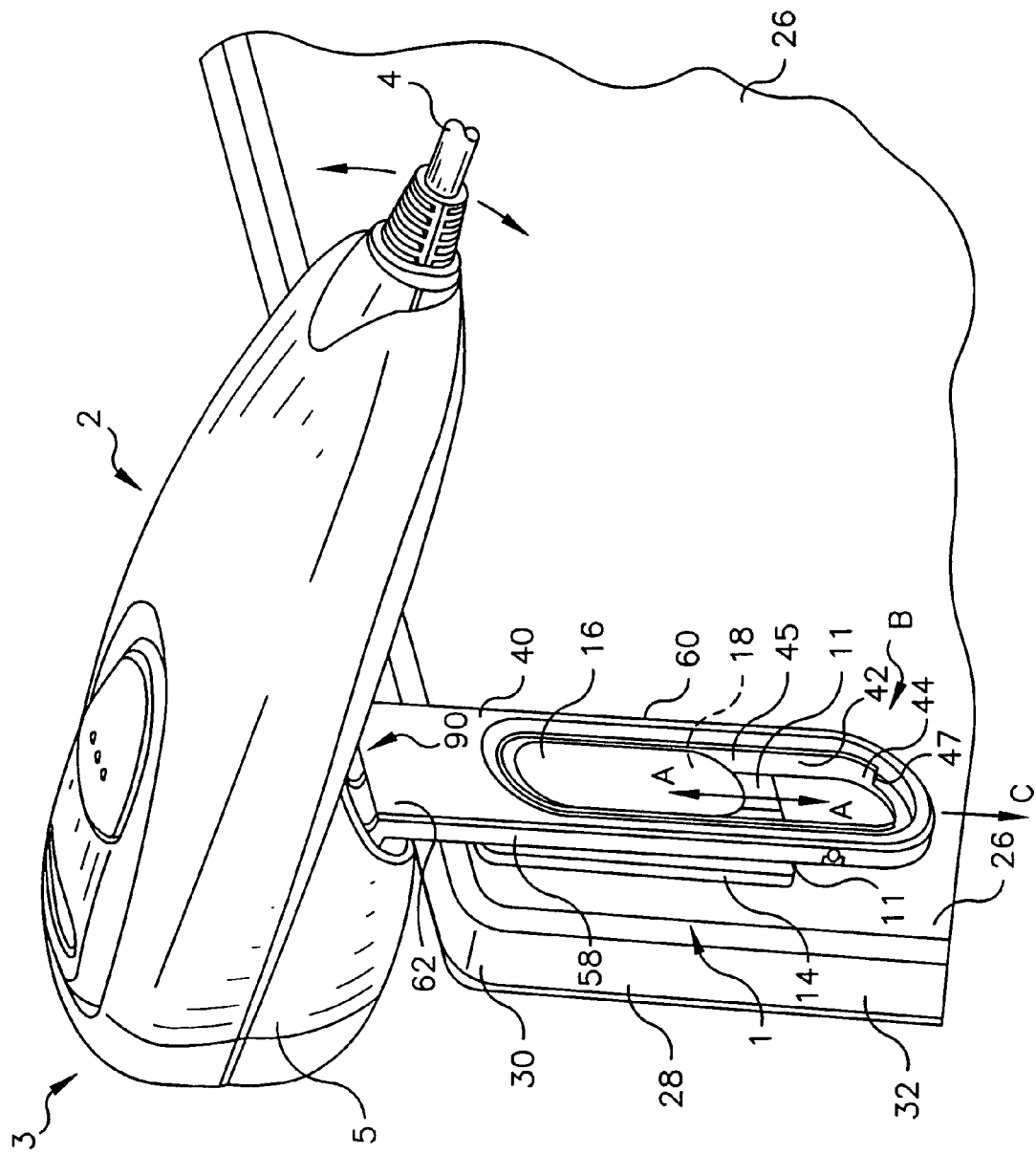
FIG. 4 is a perspective view of the base/holder/camera combination attached to the back of the laptop screen housing.

The invention is a camera mounting device, referred to generally by reference numeral 1 (see FIG. 4). The device 1 includes a base or badge 10 which can be attached to a laptop screen housing via an adhesive, a holder 40 for the camera 2 that can be mated to the base 10, and a hinge 90 in the holder 40 to allow movement of the camera 2 relative to the laptop screen housing. From the camera 2 there extends a cord or tether 4 which connects to the laptop. The term "laptop" is used herein to mean a portable computing device.

Figure 1A:
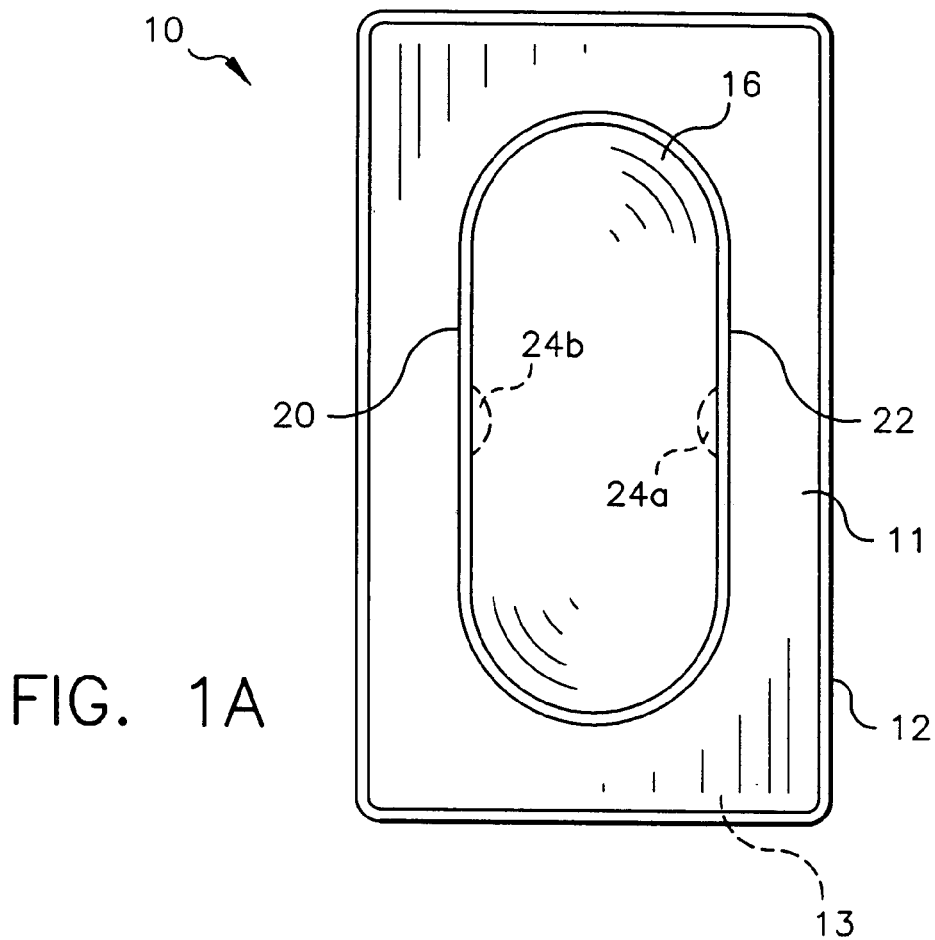
FIG. 1A is a top plan view of the base according to the present invention.
Figure 1B:
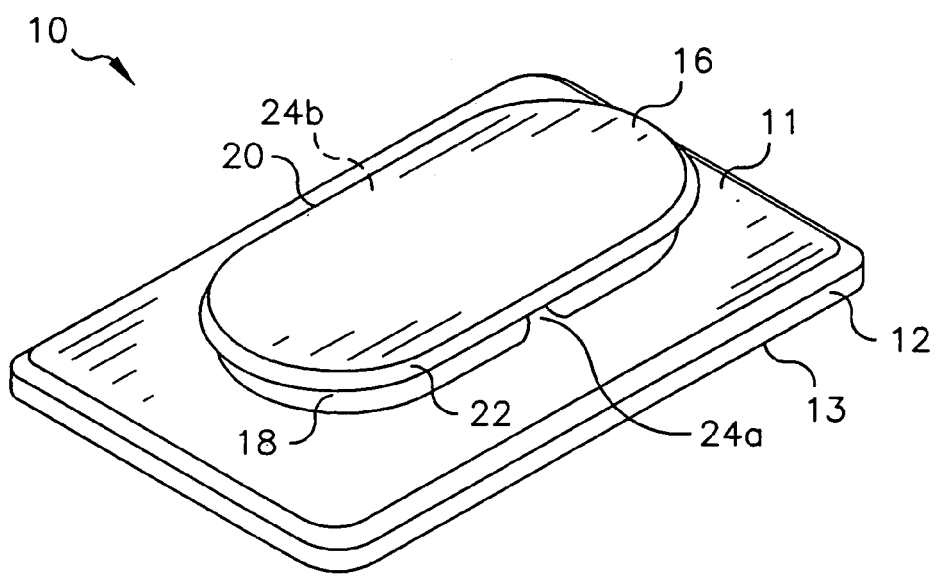
FIG. 1B is a perspective view of the base according to the present invention.
Figure 1C:
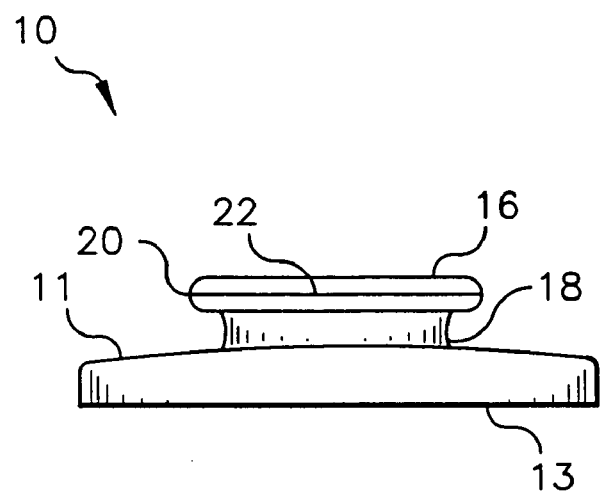
FIG. 1C is a front view of the base according to the present invention.
Figure 1D:
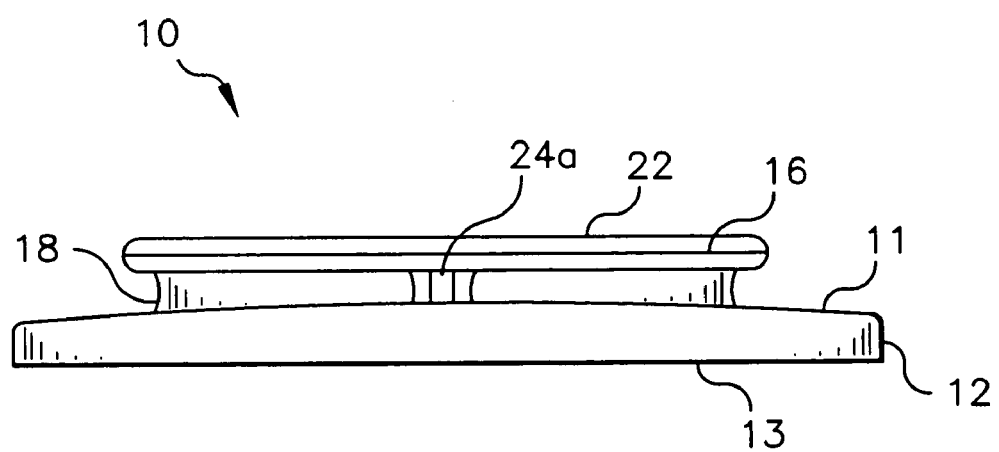
FIG. 1D is a right side view of the base according to the present invention.

The base 10 is shown particularly in FIGS. 1A–1D, wherein FIG. 1A is a top plan view, FIG. 1B is a perspective view, FIG. 1C is a front view, and FIG. 1D is a right side view. The base 10 is preferably injection molded from plastic. As can be seen, the base 10 includes support 12 which attaches to a computer via an adhesive member 14 (see, e.g., FIG. 2) formed on a front surface 13 of the base 10. The support 12 is shown to be rectangular in shape. It would be understood that other shapes, such as oval, can be used for the support 12. An example of an acceptable adhesive member 14 is removable foam tape No. 4658F, supplied by the 3M Company. The adhesive member 14 can be applied in a conventional fashion, e.g., being covered by a peelable sheet until it is desired to attach same. Of course, other adhesive arrangements can be used, such as cooperating Velcro pads or suction cups.

On top of the support 12 there is formed an oval-shaped receptacle 16 to which the holder 40 attaches, as described below. Between the support 12 and the receptacle 16, there is formed an oval-shaped recess 18. Along each of the longer sides 20 and 22 of the support 12 (left and right sides in FIG. 1A), there is formed a detent 24b, 24a, respectively, within the recess 18, the purpose for which is described below, in relation to the description of the holder 40. Other shapes, such as a rectangle or circle, could also be used for the receptacle 16.

Figure 2:
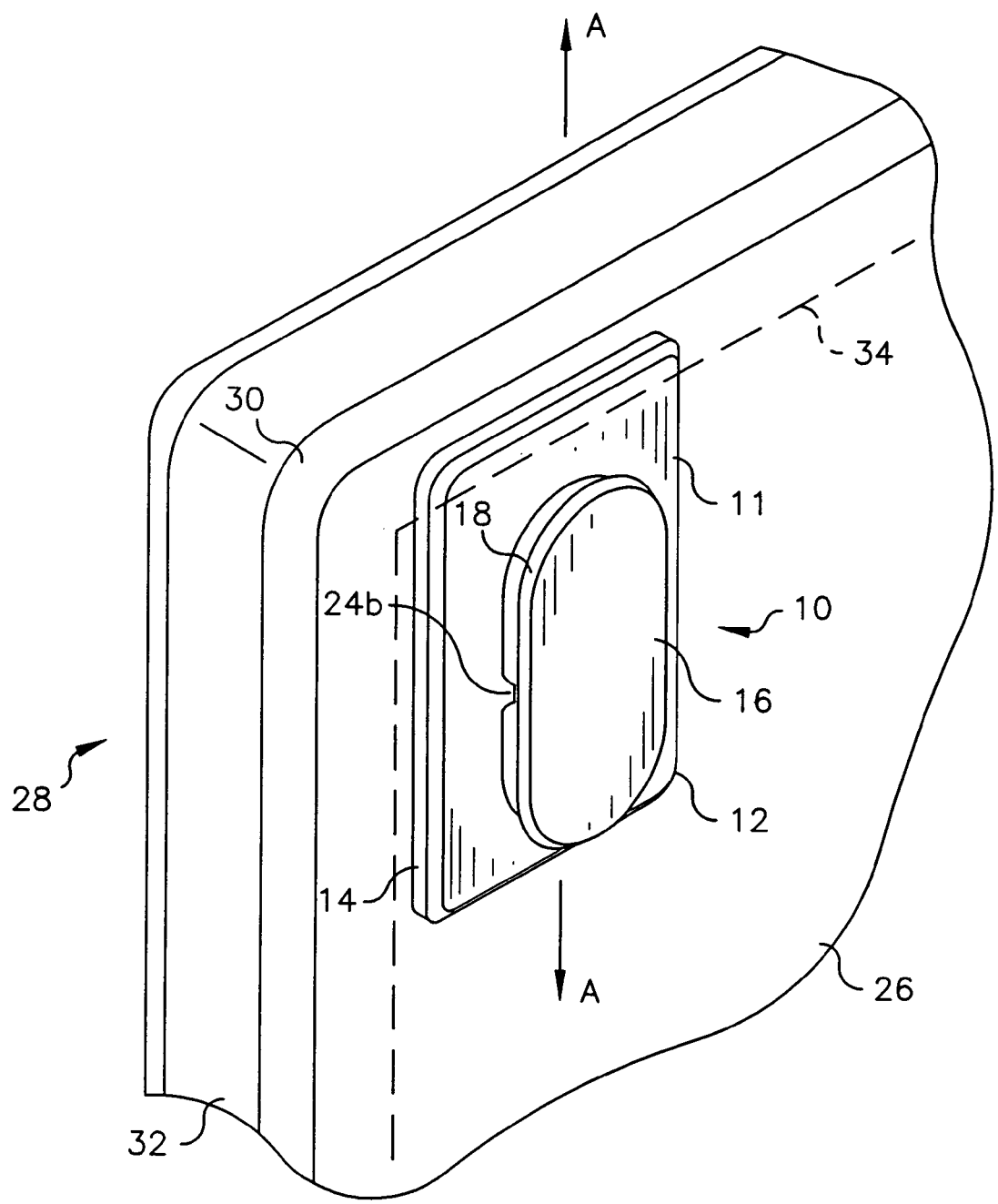
FIG. 2 is a perspective view of the base adhered to a back of a laptop screen housing.

FIG. 2 is a perspective view of the base 10 adhered to a back 26 of a laptop screen housing 28. Preferably, the base 10 is attached via the adhesive member 14 near an upper corner 30 of the back 26 of the housing 28. The base 10 should be of sufficient size, and the adhesive member 14 should be of sufficient strength, to support the weight of the holder 40 and camera 2. The base 10 is preferably oriented with a longitudinal axis "A" extending parallel to the side edge 32 of the housing 28. As the base 10 is applied merely by an adhesive member 14 on the surface (back 26) of the housing 28 opposite the actual screen 34, the base 10 application, and use of the base 10 (as well as the holder 40 and camera 2), does not damage the screen 34, as may occur with the prior art clamp mounting devices described above.

As seen in FIGS. 3–8, the holder 40 is pivotally connected to the camera 2 via a hinge 90 described below. The holder 40 is preferably injection molded from plastic. The holder 40 is an elongated member having an opening 42 with a first portion 44 near a first end 46 and having a shape substantially the same as the shape of the receptacle 16 of the base 10, but slightly larger than the perimeter of the receptacle 16, so that the receptacle 16 can be received within the first portion 44 of the holder 40. The opening 42 includes a second, inwardly ribbed portion 48 near the middle 50 of the holder 40 and co-planar with the opening 42, which portion 48 has a shape substantially like that of the recess 18 of the base 10, but with a size slightly greater than the size of the recess 18, except at projections 56a, 56b described below. An upper area 52 of the first portion 44 and a lower area 54 of the second portion 48 are open, i.e., the first and second portions 44 and 48 are continuous. The opening 42 includes the projections 56a, 56b, at sides 60, 58, respectively.

Figure 8:
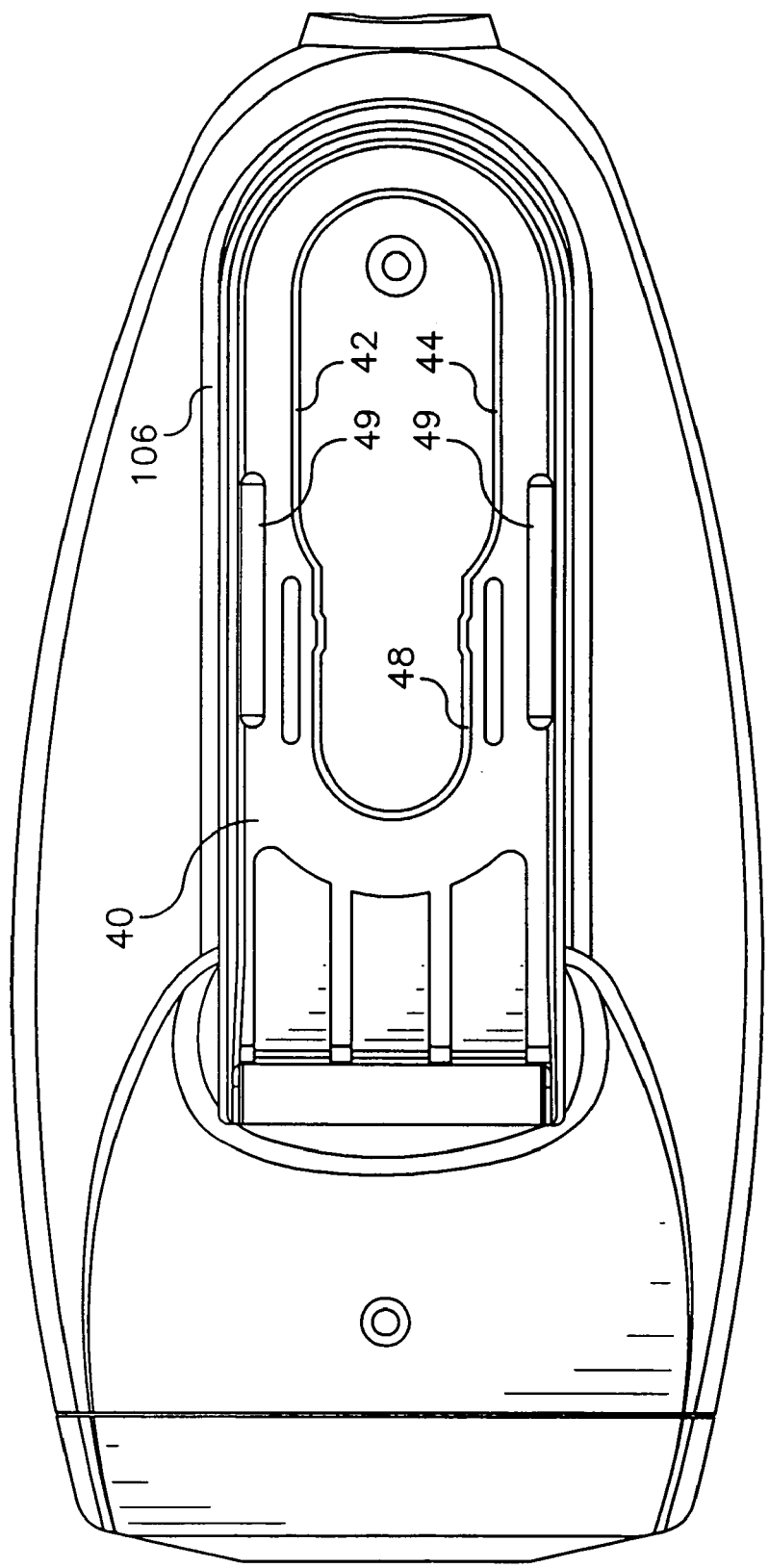
FIG. 8 is a bottom plan view of the cover of the camera receiving the holder.

The two portions 44, 48 are surrounded by a rib-like member 45 perpendicular to the plane of the portions 44, 48, except for an interruption 47 and the bottom of the lower portion 44. The interruption 47 allows the user to insert a fingertip into the interruption 47, when the holder 40 is received flush against the underside of the camera 2, as shown in FIG. 8, to pivot the holder 40 relative to the camera 2, as shown, for example, in FIGS. 3–5.

Figure 3:
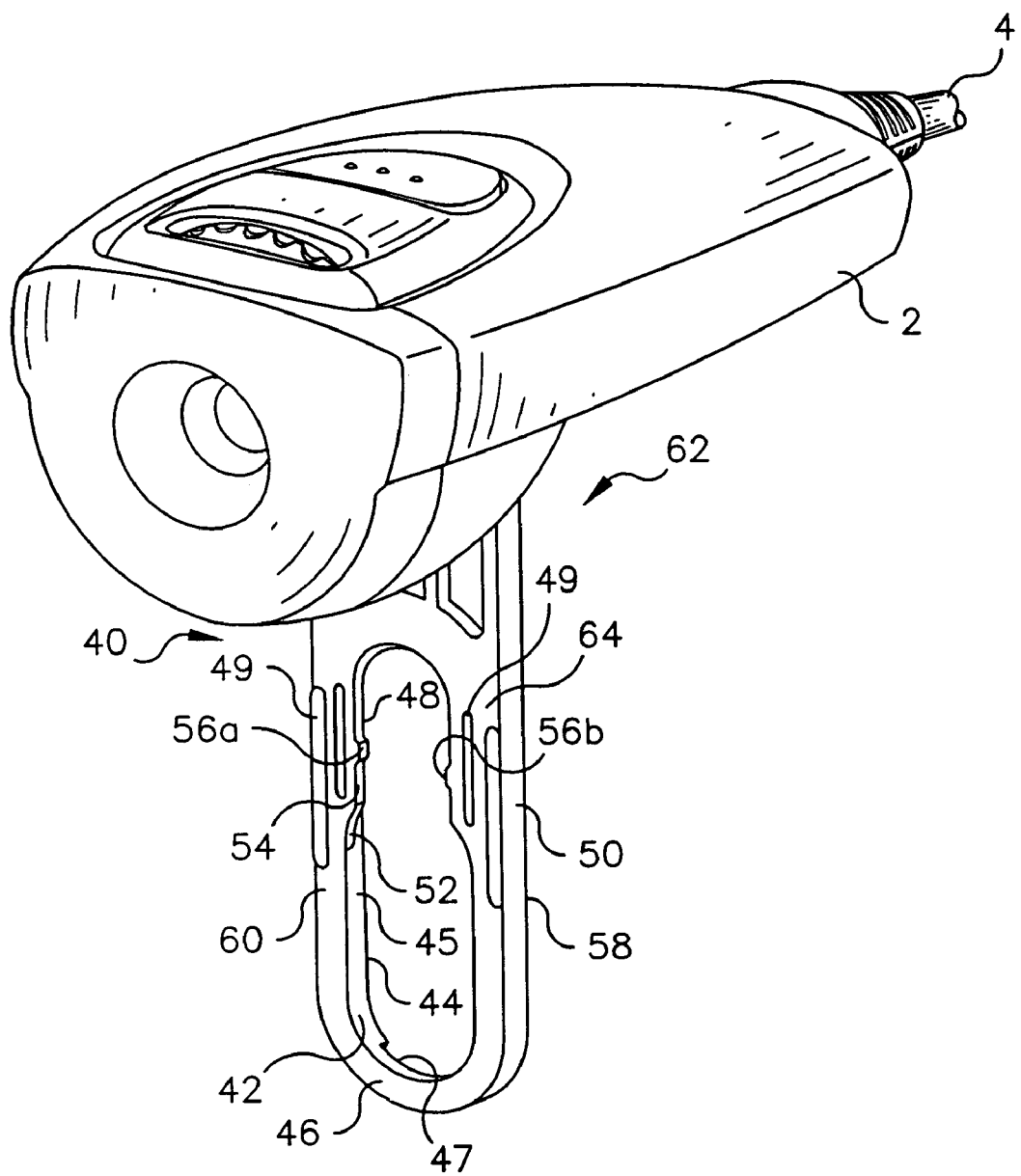
FIG. 3 is a perspective view of a holder connected to the camera.

Also, as seen particularly in FIG. 3, ribs 49 can be formed in the holder 40 to reduce wobble, i.e., improve the structural strength of the holder 40.

At a second end 62 of the holder 40, the camera 2 is attached to the holder 40 via the hinge 90, as described below.

FIG. 4 is a perspective view of a base/holder/camera combination 3 attached to the back 26 of the laptop screen housing 28. In order to attach the holder 40, with the camera 2 thereon, to the base 10, which had previously been adhered to the laptop screen housing 28, the holder 40 is moved perpendicular (along direction "B" shown in FIG. 4) to the axis "A" of the base 10, with the first portion 44 of the holder 40 over the receptacle 16. Because the size of the first portion 44 of the holder 40 is larger than the perimeter of the receptacle 16, the holder 40 can slip over the receptacle 16 until a front surface 64 (FIG. 3) thereof abuts a rear surface 11 of the base 10. Then, the first and second portions 44, 48 of the holder 40, and the recess 18 of the base 10 are oriented co-planarly, and the holder 40 is moved downward along direction "C" (FIG. 4) so that the second portion 48 is received in the recess 18. Because the sides 58, 60 of the holder 40 are relatively thin and supported only at ends thereof, they are capable of flexing, which allows the projections 56a and 56b to push against the recess 18 and push the sides 60 and 58 outwardly. However, the second portion 48 fully mates with the recess 18, when the projections 56a and 56b enter and become engaged in the corresponding detents 24a and 24b, respectively, by way of an interference fit, whereupon the sides 58, 60 return to their original unflexed positions. The holder 40 can be removed from the base 10, when desired, by reversing the above steps.

Of course, the projections could be formed in the receptacle and the detents could be formed on the holder, if desired. Further, the mating members of the base and holder could be reversed without departing from the invention. That is, the opening 42 of the holder 40 could be formed on the base 10, and the receptacle 16 and recess 18 of the base 10 could be formed on the holder 40, and these mating members could still cooperate to hold the camera on the laptop.

Figure 5:
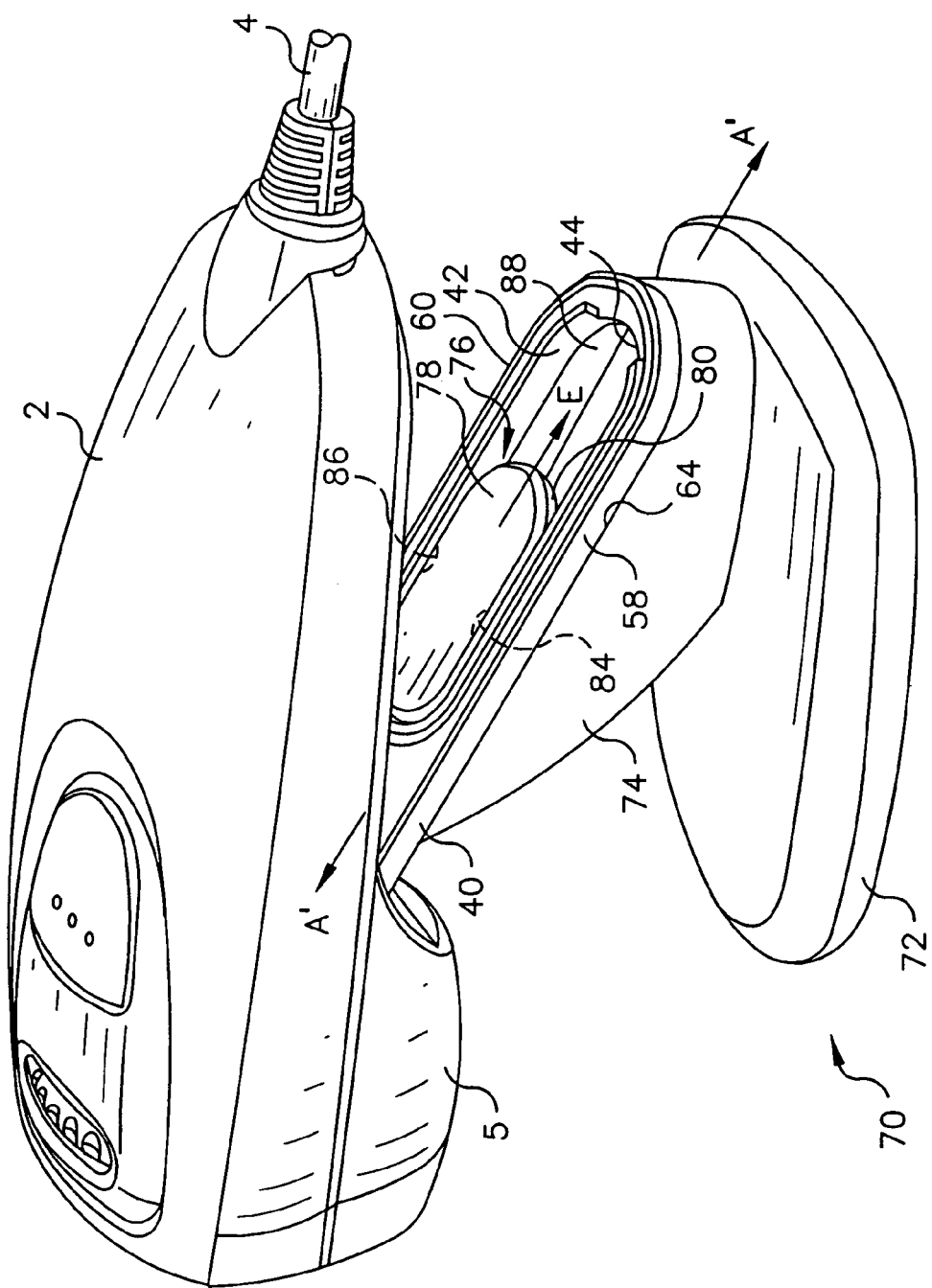
FIG. 5 is a perspective view of the camera received on a stand via the holder.

FIG. 5 is a perspective view of the camera 2 received on a separate stand 70 via the holder 40. The stand 70 might be used, e.g., when the laptop user returns to a desktop environment, and a flat desk area is available, or when the camera 2 is merely not in use, and the stand 70 provides a safe place to store the camera 2.

The stand 70 is pedestal-like in that it includes a first broadened foundation member 72 and an upward arm or extension member 74. On the extension member 74, there is formed a base 76 having dimensions similar to those of the base 10. That is, the base 76 includes an oval-shaped receptacle 78 to which the holder 40 can similarly attach. Between the extension member 74 and the receptacle 78, there is formed an oval-shaped recess 80. Along each of the longer sides of the receptacle 78, within the recess 80, there is formed a detent 84, 86, respectively.

In order to attach the holder 40, with the camera 2 thereon, to the stand 70, the holder 40 is moved perpendicular (along direction D shown in FIG. 5) on longitudinal axis "A'" of the stand 70, with the first portion 44 of the holder 40 over the receptacle 78. The size of the first portion 44 of the holder 40 is again similarly larger than the perimeter of the receptacle 78, so the holder 40 can slip over the receptacle 78 until the front surface 64 thereof abuts an upper surface 88 of the stand 70. Then, the first and second portions 44 of the holder 40 and the recess 80 are oriented co-planarly, and the holder 40 is moved downward along direction "E", so that the second portion 48 is received in the recess 80. As the second portion 48 is mating with the recess 80, the projections 56b and 56a again become securely but removably engaged in the corresponding detents 84, 86, respectively, by way of an interference fit.

In effect, each of the base 10 and the stand 70 has a T-shaped cross section area to which the holder 40 engages in an interference fit relationship after a sliding motion interlocks the respective members. That is, flexible sides 58, 60 of the holder 40 allow the projections 56b and 56a to move outward as the holder 40 with the camera 2 is attached to or detached from the base 10/stand 70. The hinge 90 then provides a mechanism by which the camera can be articulated relative to the base 10 or stand 70, as discussed below.

Figure 6:
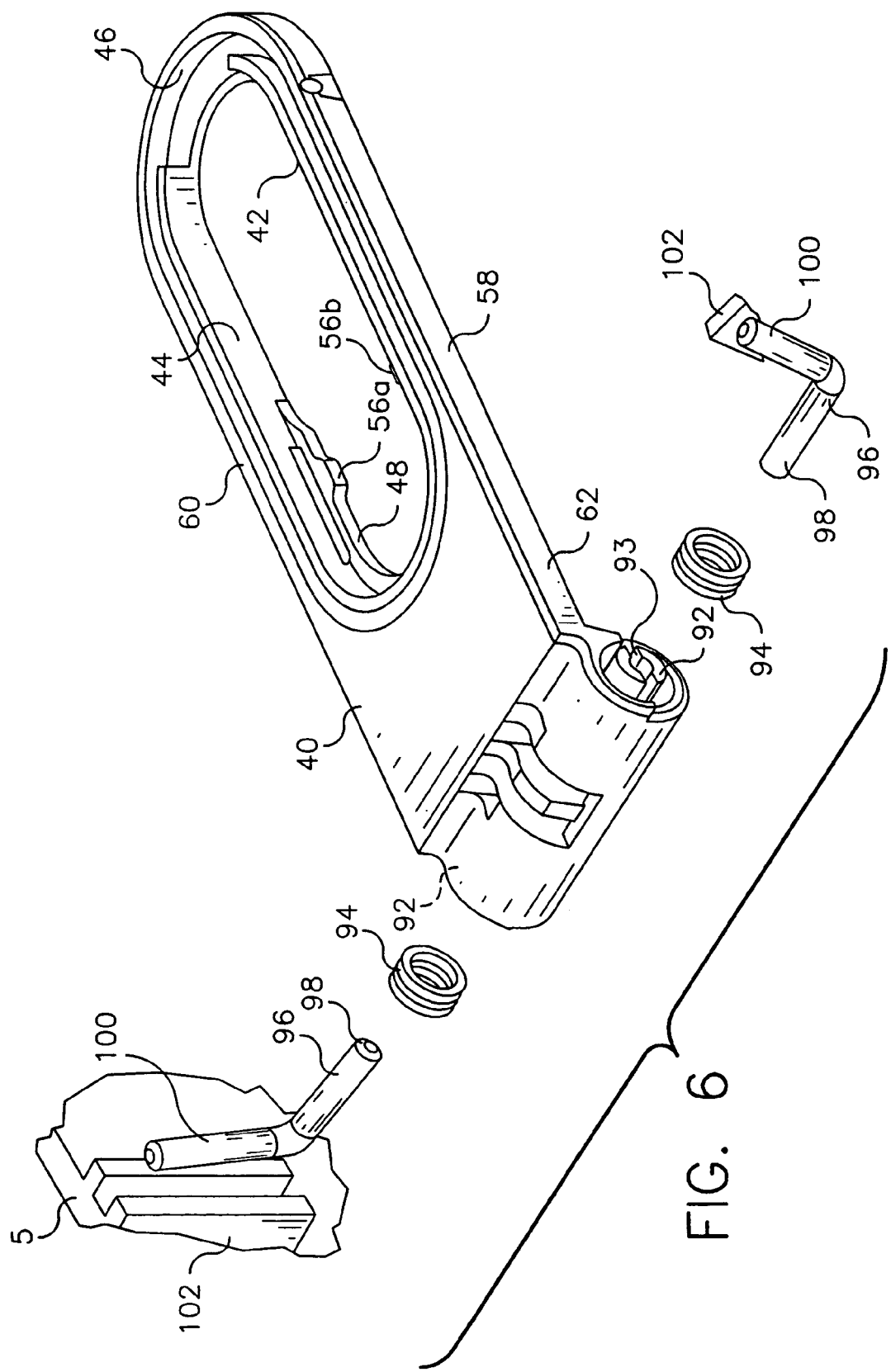
FIG. 6 is an exploded view of a hinge on the holder.
Figure 7:
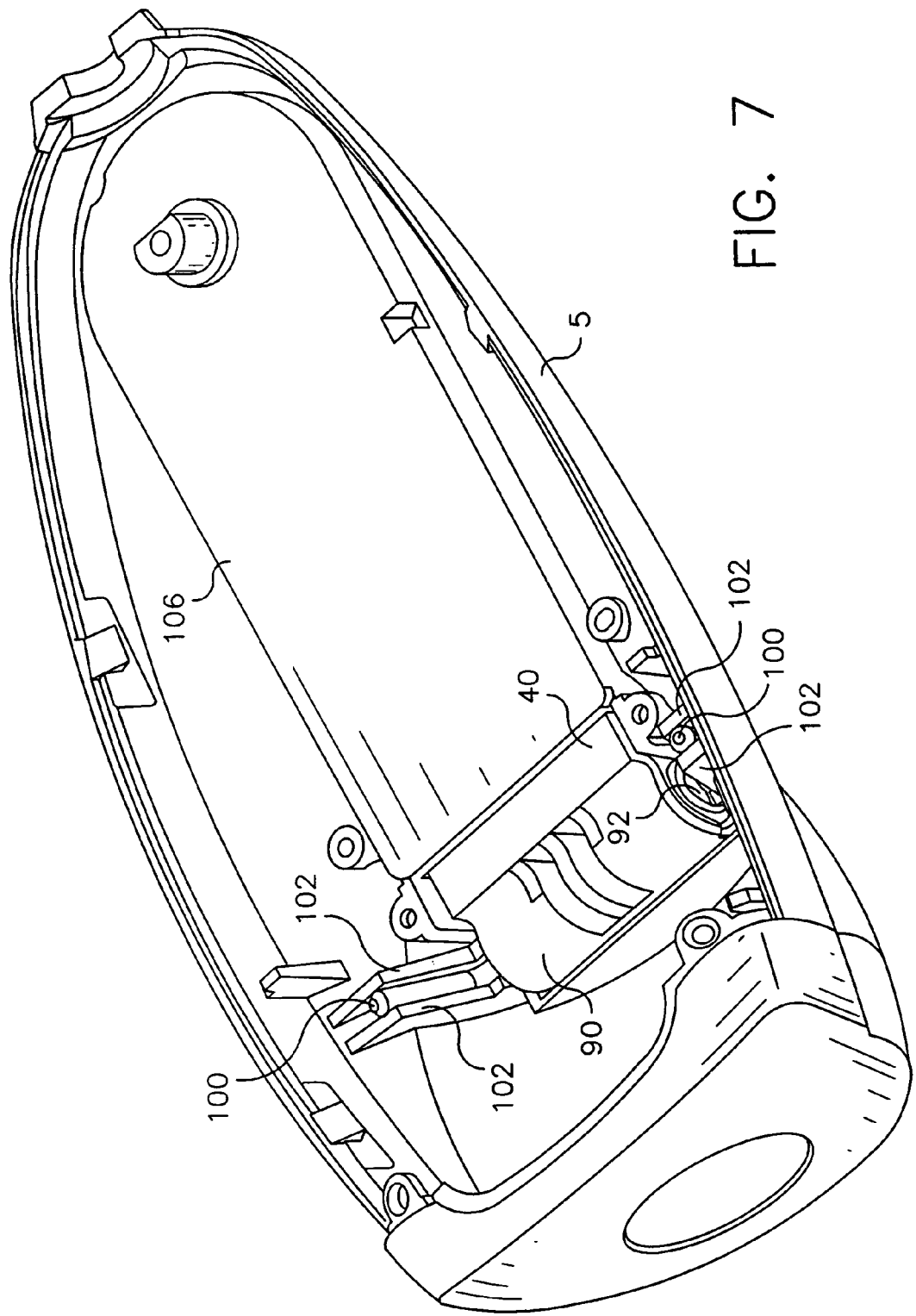
FIG. 7 is a perspective view of the interior of the cover of the camera receiving the holder.

FIG. 6 is an exploded view of the hinge 90 of the holder 40, which hinge provides appropriate frictional resistance. The hinge 90 is located at the second end 62 of the holder 40. The hinge 90 includes an integral split shaft 92 extending out of both sides of the holder 40. The shaft 92 serves as the pivot axis of the camera 2. Each split shaft 92 receives a closed coil spring 94 therearound, and a first end 98 of an L-shaped pin 96 therein. It is noted that in the hinge 90 of the present invention, in contrast with the prior art devices using spring contraction on a shaft, the part of the hinge 90 that is squeezed by the coil spring 94, i.e., the split shaft 93, is integral with the hinge 92, not a separate member. An opposite end 100 of the pin 96 is fixedly received between walls 102 of the camera cover 5 (see FIGS. 6 and 7). The cover 5 is also preferably injection molded from plastic.

More particularly, the coil springs 94 are assembled over the split shaft 92 portion of the holder 40. An inside diameter of each coil spring 94 is slightly smaller than an outside diameter of the split shaft 92. Because the coil springs 94 are much stiffer than the split shaft, the split shaft 92 is compressed inwardly during the assembly process. Next, the first end 98 of each pin 96 is pressed into the split 93 in the shaft 92. Since the shaft 92 is compressed inward by the coil spring 94, the resulting space on the inside diameter of the shaft 92 is smaller than the outer diameter of the pin 96 (the inside diameter of the uncompressed shaft 92 is equal to the pin 96 diameter). Since the pin 96 is much stiffer than the coil spring 94, the coil spring 94 diameter is forced open (slightly) as the pin 96 is pressed into place. The coil spring 94 then provides a moderately high compressive force between the shaft 92 and the pin 96. The second ends 100 of the pins 96 are then assembled into the cover 5, between the walls 102, and retained in place. Then, as the hinge 90 is rotated, a moderately high frictional force is created between the hinge 90 and the camera 2.

The advantages of the hinge 90 of the present invention relative to the prior art laptop hinges include the following. This hinge 90 provides a moderately high frictional force, i.e., about 20 inch-ounces. Conventional hinges for laptops, etc., appear to provide much too high a force: on the order of 2–4 inch-pounds and higher. The hinge 90 is very compact. Finally, the hinge 90 is less expensive to produce than conventional designs.

Further, a hinge 90 of this type must be able to maintain its torque requirements after actuating the hinge about two thousand times, and after being subjected to elevated temperatures, i.e., about 160 degrees F. The present hinge 90 satisfies both of these requirements. Since the pin 96 has a very smooth surface, there is very little wear of the plastic split shaft 92, even with the moderately high force. The hinge 90 of the present invention is also essentially immune to creep because creep generally does not occur in metals (the springs 94 and pins 96), and plastics are less susceptible to creep in compression, as opposed to bending.

Using the hinge 90, the holder 40 is movable between a position substantially perpendicular to the camera 2, as shown in FIG. 4, to a position folded against the underside of the camera cover 5, in a recess 106, as shown in FIG. 8, and any position in between, such as shown in FIG. 5. In the latter regard, with the holder 40 folded against the cover 5, the holder 40 is protected against damage should the camera 2 be dropped or hit against something. Also, the camera 2 can be moved about easier, without the holder 40 getting in the way.

As can be seen, the base 10 is easily and safely attached to the computer by an adhesive. Any computer with a reasonably flat surface can accept the base 10, which ensures that the base will be adaptable to a wide variety of computer models.

Adoption of the present invention to a desk top computer is not preferred. For example, if the tethered camera is mounted on top of a CRT housing, the housing may appear in the camera's view. Further, if the camera is placed on the side of such housing, a conventional camera would produce a side view. Nevertheless, the present invention may be applicable to other than conventional laptop computers.

The camera and holder combination can be easily attached to or detached from the base 10 as need be, and the base 10 can remain unobtrusively attached to the computer. When attached to the computer, the camera 2 is stably held in position to allow easier hands-free use of the camera. Also, the present mounting device can be used reliably, particularly when a relatively flat work surface is not available. Further, because the device mounts the camera high on the computer above the work area, the device and camera do not take up valuable work space, and it is less likely that the camera will be knocked, or that some beverage will be spilled on the camera. Finally, unlike the conventional clamps used to mount such cameras on laptops, the present invention is not likely to damage the laptop or interfere with viewing the screen.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A device for mounting a camera relative to a portable computer having a first housing, and a second housing, movable relative the first housing, having a front portion for a screen, and having a rear portion opposite the front portion, comprising:
   a base adhered to the rear portion;
   a camera holder removably connected to the base by cooperating first and second mating members;
   wherein, the first mating member is a receptacle formed to extend from a support of the base, and
   wherein a recess is formed between the support and the receptacle; and
   wherein the second mating member is a first opening formed in the holder, which first opening is larger than the receptacle, and a second opening that is continuous with the first opening and receives by an interference fit the recess formed in the base; and
   wherein the interference fit includes a projection formed on the second opening, and a detent formed in the recess; and
   a hinge formed between the holder and the camera to allow the camera to be moved relative to the holder.

2. The device as recited in claim 1, wherein the projection is formed on a flexible portion of the holder.

3. The device as recited in claim 1, wherein the projection is two projections, each extending into the second opening in opposition to the other.

4. The device as recited in claim 1, wherein the base is adhered by one of an adhesive, Velcro and suction cups.

5. The device as recited in claim 1, further comprising a separate stand for receiving the holder, the stand having a third mating member formed thereon, so that the second and third mating members cooperate to removably engage the stand and the holder.

6. The device as recited in claim 5, wherein the third mating member is a receptacle formed to extend from an extension on the stand.

7. The device as recited in claim 6, wherein a recess is formed between the extension and the receptacle of the stand.

8. A device for mounting a camera relative to a computer, comprising:
   a base including a receptacle extending from a support, which support is adhered to the computer;
   a camera holder having an opening which is larger than and receives the receptacle in removable engagement; and
   a hinge formed between the holder and the camera to allow the camera to be moved relative to the holder;
   wherein the hinge includes a shaft formed in the holder with a slit therein, an L-shaped pin, a first end of which rotatably fits into the slit in the shaft, and a second end of which fits non-movably on the camera, and a spring which surrounds the shaft and exerts inward pressure on the shaft and pin, and
   wherein the first end rotates in a frictional arrangement in the shaft.

9. The device as recited in claim 8, wherein a recess is formed between the support and the receptacle,
   wherein the opening includes a rib, and
   wherein the holder and the base are removably engaged by placing the opening over the receptacle, and sliding the holder such that the rib is received in the recess.

10. The device as recited in claim 9, wherein the opening includes a projection, and the recess includes a detent, and
    wherein the projection is received in the detent via an interference fit.

11. The device as recited in claim 8, wherein a pair of the hinges is formed between the holder and the camera.

12. The device as recited in claim 8, further comprising a separate stand for receiving the holder, the stand having a receptacle formed to extend from an extension on the stand, so that the receptacle on the stand and the opening on the holder cooperate to removably engage the stand with the holder.

13. The device as recited in claim 12, wherein a recess is formed between the extension support and the receptacle of the stand.

14. The device as recited in claim 13, wherein the stand has an axis, and the holder and the stand are removably engaged by placing the opening of the holder over the receptacle of the stand perpendicular relative to the stand axis, and sliding the holder in the direction of the axis such that the opening of the holder engages the receptacle of the stand by an interference fit.

15. The device as recited in claim 14, wherein the interference fit includes a projection formed on the second opening of the holder, and a detent formed in the recess of the stand.

16. A device for mounting a camera relative to a portable computer having a first housing, and a second housing, movable relative the first housing, having a front portion for a screen, and having a rear portion opposite the front portion, comprising:
   a base adhered to the rear portion, and including a receptacle formed to extend from a support of the base, which base is adhered via an adhesive between the support and the rear portion of the portable computer, and a recess is formed between the support and the receptacle;

a camera holder having a first opening which corresponds to but is larger than the receptacle, and a second opening that is continuous with the first opening and receives the recess formed in the base; and a hinge formed between the holder and the camera to allow the camera to be moved relative to the holder;

wherein the base has an axis, and the holder and the base are removably engaged by placing the first opening over the receptacle perpendicular relative to the axis, and sliding the holder in the direction of the axis such that the second opening engages the receptacle by an interference fit, wherein the interference fit includes a projection formed on the second opening, received in a corresponding detent formed in the recess, wherein the projection is formed on a flexible portion of the holder, wherein the hinge includes a shaft formed in the holder with a slit therein, an L-shaped pin, a first end of which rotatably fits into the slit in the shaft, and a second end of which fits non-movably on the camera, and a spring which surrounds the shaft and exerts inward pressure on the shaft and pin, and wherein the first end rotates in a frictional arrangement with the shaft.

17. The device as recited in claim 16, further comprising:
a separate stand for receiving the holder, the stand having a receptacle formed to extend from an extension of the stand; and
a recess formed between the extension support and the receptacle,
wherein the stand has an axis, and the holder and the base are removably engaged by placing the first opening of the holder over the receptacle of the stand perpendicular relative to the stand axis, and sliding the holder in the direction of the axis such that the second opening of the holder engages the receptacle of the stand by an interference fit, and
wherein the interference fit includes a projection formed on the second opening of the holder engaging a detent formed in the recess of the stand.

18. A method for mounting a camera on a computer, comprising the steps of:
adhering a base to a portion of the computer that is spaced from a screen, said base having an axis;
moving a camera holder perpendicularly relative to the axis, so that an opening formed in the holder receives a first mating member formed on a portion the base; and
moving the holder in a direction along the axis so that a second mating member formed on the holder removably engages the first mating member of the base;
wherein the step of moving the holder in the direction along the axis further comprises outwardly flexing a portion of the holder, and engaging a projection formed on the holder with a detent formed on the base.

19. The method as recited in claim 18, wherein the adhering step comprises the step of applying adhesive between the portion of the computer and the base.

20. The method as recited in claim 18, further comprising the steps of:
providing a separate stand with an axis;

moving the camera holder perpendicularly relative to the axis of the stand, so that the opening formed in the holder receives a third mating member formed on the stand; and
moving the holder in a direction along the axis of the stand, so that the second mating member formed on the holder engages the third mating member of the stand.

21. The method as recited in claim 20, wherein the step of moving the holder along the axis of the stand further comprises the step of outwardly flexing a portion of the holder.

22. The method as recited in claim 21, wherein the step of flexing the holder comprises the step of engaging a projection formed on the holder with a detent formed on the stand.

23. A device for mounting a camera relative to a portable computer having a first housing, and a second housing, movable relative the first housing, having a front portion for a screen, and having a rear portion opposite the front portion, comprising:
a base adhered to the rear portion;
a camera holder removably connected to the base by cooperating first and second mating members;
wherein, the first mating member is formed on one of the base and holder, and
wherein the second mating member is formed on the other of the base and holder; and
a hinge formed between the holder and the camera to allow the camera to be moved relative to the holder, wherein the hinge includes a shaft formed in the holder with a slit therein, an L-shaped pin, a first end of which rotatably fits into the slit in the shaft, and a second end of which fits non-movably on the camera, and a spring which surrounds the shaft and exerts inward pressure on the shaft and pin, and wherein the first end rotates in a frictional arrangement in the shaft.

24. The device as recited in claim 23, wherein a pair of the hinges is formed between the holder and the camera.

25. The device as recited in claim 23, wherein the first mating member is a receptacle formed to extend from a support of the base.

26. The device as recited in claim 25, wherein the second mating member is a first opening formed in the holder, which opening is larger than the receptacle.

27. The device as recited in claim 25, wherein a recess is formed between the support and the receptacle.

28. The device as recited in claim 27, wherein the second mating member is a first opening formed in the holder, which first opening is larger than the receptacle, and a second opening that is continuous with the first opening and receives by an interference fit the recess formed in the base.

29. The device as recited in claim 28, wherein the interference fit includes a projection formed on the second opening, and a detent formed in the recess.

30. The device as recited in claim 29, wherein the projection is formed on a flexible portion of the holder.

31. The device as recited in claim 29, wherein the projection is two projections, each extending into the second opening in opposition to the other.

32. The device as recited in claim 28, further comprising a separate stand for receiving the holder, the stand having a third mating member formed thereon, so that the second and third mating members cooperate to removably engage the stand and the holder.

33. The device as recited in claim 32, wherein the third mating member is a receptacle formed to extend from an extension on the stand.

34. The device as recited in claim 33, wherein a recess is formed between the extension and the receptacle of the stand.

35. The device as recited in claim 23, wherein the base is adhered by one of an adhesive, Velcro and suction cups.

36. A device for mounting a camera relative to a portable computer having a first housing, and a second housing, movable relative the first housing, having a front portion for a screen, and having a rear portion opposite the front portion, comprising:
- a base adhered to the rear portion;
- a camera holder removably connected to the base by cooperating first and second mating members;
- wherein, the first mating member is a receptacle formed to extend from a support of the base, and a recess is formed between the support and the receptacle; and
- wherein the second mating member is a first opening formed in the holder, which first opening is larger than the receptacle, and a second opening that is continuous with the first opening and receives by an interference fit the recess formed in the base;
- a separate stand for receiving the holder, the stand having a third mating member formed thereon, so that the second and third mating members cooperate to removably engage the stand and the holder;
- wherein the third mating member is a receptacle formed to extend from an extension on the stand, and a recess is formed between the extension and the receptacle of the stand; and
- wherein the stand has an axis, and the holder and the stand are removably engaged by placing the first opening of the holder over the receptacle of the stand perpendicular relative to the stand axis, and sliding the holder in the direction of the stand axis such that the second opening of the holder engages the receptacle of the stand by an interference fit; and
- a hinge formed between the holder and the camera to allow the camera to be moved relative to the holder.

37. The device as recited in claim 36, wherein the interference fit includes a projection formed on one of the second opening of the holder and the recess of the stand, and a detent formed in the other of the recess of the stand and the second opening of the holder.

* * * * *